US012046391B2

(12) United States Patent
Men et al.

(10) Patent No.: US 12,046,391 B2
(45) Date of Patent: Jul. 23, 2024

(54) METHOD FOR PREPARING LOW MELTING POINT METAL PARTICLES, CONDUCTIVE PASTE AND METHOD FOR PREPARING THE SAME

(71) Applicant: BEIJING DREAM INK TECHNOLOGIES CO., LTD., Beijing (CN)

(72) Inventors: Zhenlong Men, Beijing (CN); Zhongwei Ren, Beijing (CN); Jiameng Kang, Beijing (CN)

(73) Assignee: Beijing Dream Ink Technologies Co., Ltd., Beijing (CN)

( * ) Notice: Subject to any disclaimer, the term of this patent is extended or adjusted under 35 U.S.C. 154(b) by 61 days.

(21) Appl. No.: 17/776,739

(22) PCT Filed: Oct. 20, 2021

(86) PCT No.: PCT/CN2021/124896
§ 371 (c)(1),
(2) Date: May 13, 2022

(87) PCT Pub. No.: WO2022/100385
PCT Pub. Date: May 19, 2022

(65) Prior Publication Data

US 2023/0162882 A1 May 25, 2023

(30) Foreign Application Priority Data

Nov. 11, 2020 (CN) ........................ 202011252018.2

(51) Int. Cl.
*H01B 1/22* (2006.01)
*B22F 1/103* (2022.01)

(52) U.S. Cl.
CPC ............... *H01B 1/22* (2013.01); *B22F 1/103* (2022.01); *B22F 2201/02* (2013.01); *B22F 2201/11* (2013.01); *B22F 2201/20* (2013.01)

(58) Field of Classification Search
CPC ... H01B 1/02; H01B 1/22; B22F 1/103; B22F 1/105; B22F 2201/10; B05D 5/12
See application file for complete search history.

(56) References Cited

U.S. PATENT DOCUMENTS 3,597,610 A * 8/1971 Bayol ........................ G01T 1/08
250/214 LA
9,132,514 B2 * 9/2015 Ishikawa .................. B22F 9/06
(Continued)

FOREIGN PATENT DOCUMENTS

CN 101786167 B 5/2012
CN 108665997 A 10/2018
(Continued)

OTHER PUBLICATIONS

English language translation of form PCT/ISA/237 (mailed Jan. 2022).*
(Continued)

*Primary Examiner* — Mark Kopec
(74) *Attorney, Agent, or Firm* — Millen, White, Zelano & Branigan P.C.; William F. Nixon

(57) ABSTRACT

A method for prepares low melting point metal particles, a conductive paste and a method for preparing the conductive paste, and relates to the technical field of functional materials. The method for preparing low melting point metal particles includes providing an organic resin carrier having fluidity, adding a low melting point metal material and the organic resin carrier into a sealed container for a vacuuming operation or filling a protective gas, making a temperature in the sealed container higher than the melting point of the low melting point metal and performing dispersion by stirring,
(Continued)

and lowering the temperature, after performing the dispersion, to be below the melting point of the low melting point metal with continuous stirring during a cooling process to obtain low melting point metal particles dispersed in the organic resin carrier. Low melting point metal particles can be effectively prepared.

6 Claims, 3 Drawing Sheets

(56) References Cited

U.S. PATENT DOCUMENTS

| | | | | |
|---|---|---|---|---|
| 9,656,351 | B2 * | 5/2017 | Matsugi | B23K 35/26 |
| 11,325,210 | B2 * | 5/2022 | Xu | B23K 35/262 |
| 11,479,835 | B2 * | 10/2022 | Zhang | B23K 35/264 |

FOREIGN PATENT DOCUMENTS

| | | | |
|---|---|---|---|
| CN | 108856702 | A | 11/2018 |
| CN | 107274965 | B | 7/2019 |
| CN | 110465672 | A | 11/2019 |
| CN | 110964461 | A | 4/2020 |
| CN | 110964469 | A | 4/2020 |
| IN | 110434350 | A | 11/2019 |
| JP | 2006172728 | A | 6/2006 |
| JP | 2010236009 | A | 10/2010 |
| JP | 5033017 | B2 | 9/2012 |
| JP | 2013196936 | A | 9/2013 |

OTHER PUBLICATIONS

English language machine translation of CN 110434350 (pub date Nov. 2019).*
English language machine translation of CN 110964469 (pub date Apr. 2020).*
English language machine translation of CN 110964461 (pub date Apr. 2020).*
Liu et al "Mechanical Property of Sn—58Bi Solder Paste Strengthened by Resin", Appl. Sci. 2018, 8, 2024; doi: 10.3390/app8112024.*
Eom et al "Characterization of a Hybrid Cu Paste as an Isotropic Conductive Adhesive", ETRI Journal, vol. 33, No. 6, Dec. 2011.*
International Search Report for PCT/CN2021/124896 dated Jan. 19, 2022.
English Abstract of CN110964461, Publication Date: Apr. 7, 2020.
English Abstract of CN108665997, Publication Date: Oct. 16, 2018.
English Abstract of CN110964469, Publication Date: Apr. 7, 2020.
English Abstract of JP2006172728, Publication Date: Jun. 29, 2006.
English Abstract of JP2013196936, Publication Date: Sep. 30, 2013.
Notice of the first review opinion in corresponding CN Application No. 2020112520182 dated Aug. 29, 2022 (pp. 1-10).

* cited by examiner

METHOD FOR PREPARING LOW MELTING POINT METAL PARTICLES, CONDUCTIVE PASTE AND METHOD FOR PREPARING THE SAME

CROSS-REFERENCE TO RELATED APPLICATIONS

The present disclosure claims priority to Chinese Patent Disclosure No. 202011252018.2, titled with "method for preparing low melting point metal particles, conductive paste and method for preparing the same" and filed on Nov. 11, 2020, the content of which is incorporated herein by reference in its entirety.

TECHNICAL FIELD

The present disclosure relates to the technical field of functional materials, and, particularly, relates to a method for preparing low melting point metal particles, a conductive paste and a method for preparing the conductive paste.

BACKGROUND

At present, methods for preparing metal powders mainly comprise ball milling, grinding, atomization, reduction, and chemical replacement. However, for low melting point metals, there are many restrictions on preparing powders by the above methods. Firstly, ball milling, grinding, and atomization are likely to cause oxidation of low melting point metals; secondly, since low melting point metals have a low melting point, local temperatures may be excessively high during mechanical processing such as ball milling and grinding, which may cause melting and agglomeration of low melting point metals, thereby obtaining metal particles of non-uniformity in size; thirdly, in order to meet the demand for melting point in practical applications, the common low melting point metals are low melting point alloys but not elemental metals, however, a chemical replacement method can only be used to prepare elemental metals.

SUMMARY

The present disclosure provides a method for preparing low melting point metal particles, a conductive paste and a method for preparing the conductive paste, which can be used to effectively prepare low melting point metal particles.

A first aspect of the present disclosure provides a method for preparing low melting point metal particles, which adopts following technical solutions.

The method for preparing low melting point metal particles includes:

- S11, S11, providing an organic resin carrier having fluidity;
- S12, adding a low melting point metal material and the organic resin carrier into a sealed container for a vacuuming operation or filling a protective gas;
- S13, making a temperature in the sealed container higher than the melting point of the low melting point metal and performing dispersion by stirring; and
- S14: lowering the temperature, after performing the dispersion, to be below the melting point of the low melting point metal with continuous stirring during a cooling process to obtain low melting point metal particles dispersed in the organic resin carrier.

Optionally, the melting point of the low melting point metal is higher than room temperature and lower than 200° C.

Optionally, the method for preparing the low melting point metal particles further comprises: before adding the low melting point metal material and the organic resin carrier into the sealed container, removing oxides in the low melting point metal material.

Optionally, the method for preparing the low melting point metal particles further comprises: after obtaining the low melting point metal particles dispersed in the organic resin carrier, dissolving, washing and drying the organic resin in the organic resin carrier to separate the low melting point metal particles.

Optionally, the organic resin carrier is an organic resin having fluidity at room temperature.

Optionally, the organic resin carrier is a first organic resin solution obtained by dissolving a first organic resin with a first solvent.

Further, the weight percentage of the organic resin in the organic resin carrier is 10% to 70%.

A second aspect of the present disclosure provides a method for preparing a conductive paste, which adopts following technical solutions.

The method for preparing the conductive paste includes:

- S21, providing an organic resin carrier having fluidity;
- S22, adding a low melting point metal material and the organic resin carrier into the sealed container for a vacuuming operation or filling a protective gas;
- S23, making a temperature in the sealed container higher than the melting point of the low melting point metal and performing dispersion by stirring;
- S24, lowering the temperature, after performing the dispersion, to be below the melting point of the low melting point metal with continuous stirring during a cooling process to obtain low melting point metal particles dispersed in the organic resin carrier;
- S25, mixing a conductive filler with the material obtained in S24 uniformly to obtain the conductive paste.

Optionally, the method for preparing the conductive paste further includes: in S22, adding a second organic resin solution obtained by dissolving a second organic resin with a second solvent.

Optionally, S25 includes: loading a conductive filler together with the material obtained in S24 into a sealed container; pre-dispersing with a mixer; processing with a three-axis rolling mill; and vacuuming to defoam.

Optionally, the method for preparing the conductive paste further comprises: adding a viscosity modifier to adjust the viscosity of the conductive paste.

A third aspect of the present disclosure provides a method for preparing a conductive paste, which adopts following technical solutions.

The method for preparing the conductive paste includes:

- S31, providing an organic resin carrier having fluidity;
- S32, adding a low melting point metal material and the organic resin carrier into the sealed container for a vacuuming operation or filling a protective gas;
- S33, making a temperature in the sealed container higher than the melting point of the low melting point metal and performing dispersion by stirring;
- S34, lowering the temperature, after performing the dispersion, to be below the melting point of the low melting point metal with continuous stirring during the cooling process to obtain low melting point metal particles dispersed in the organic resin carrier;

S35, dissolving, washing and drying the organic resin in the organic resin carrier to separate low melting point metal particles;

S36, dissolving a third organic resin with a third solvent to obtain a third organic resin solution; and S37, adding a conductive filler and the low melting point metal particles to the third organic resin solution obtained in S36, and mixing uniformly the mixture to obtain the conductive paste.

Optionally, S37 includes: jointly loading a conductive filler, the low melting point metal particles and the material obtained in S36 into a sealed container; pre-dispersing with a mixer; processing with a three-axis rolling mill; and vacuuming to defoam.

A fourth aspect of the present disclosure provides a conductive paste, which adopts following technical solutions.

The conductive paste is prepared by any one of the above methods.

The particle size of the low melting point metal particles is in a range of 0.1 μm to 20 μm.

The present disclosure provides a method for preparing low melting point metal particles, a conductive paste and a method for preparing the conductive paste. The method for preparing the low melting point metal particles includes: providing an organic resin carrier having fluidity; adding a low melting point metal material and the organic resin carrier into a sealed container, the sealed container vacuuming or filling with a protective gas; making a temperature in the sealed container higher than the melting point of the low melting point metal while stirring dispersion is performed; lowering the temperature to be below the melting point of the low melting point metal after the stirring dispersion is completed, continuing to stir during the cooling process, and obtaining low melting point metal particles dispersed in the organic resin carrier. In the above preparing process, firstly, it is carried out under vacuum or protective gas to prevent the oxidation of low melting point metals; secondly, there is no strong mechanical collision, which may not cause local high temperature, and can prevent the melting and agglomeration of low melting point metals; thirdly, low melting point metal particles can be prepared, and low melting point alloys can also be prepared. Therefore, the method for preparing low melting point metal particles in the present disclosure can effectively prepare low melting point metal particles.

BRIEF DESCRIPTION OF DRAWINGS

In order to more clearly explain some embodiments of the present disclosure or the technical solution in the related art, the drawings used in the description of the embodiments or the related art will be briefly described below. The drawings in the following description are some embodiments of the present disclosure. A person skilled in the art may obtain other drawings based on these drawings.

DESCRIPTION OF EMBODIMENTS

In order to more clearly illustrate objects, technical solutions and advantages of embodiments of the present disclosure, the technical solutions in some embodiments of the present disclosure are clearly and completely described below with reference to the accompanying drawings in some embodiments of the present disclosure. The described embodiments are merely part of the embodiments of the present disclosure rather than all of the embodiments. All other embodiments obtained by a person skilled in the art shall fall into the scope of the present disclosure.

It should be noted that various technical features in embodiments of the present disclosure can be combined with one another if there is no conflict.

Figure 1:
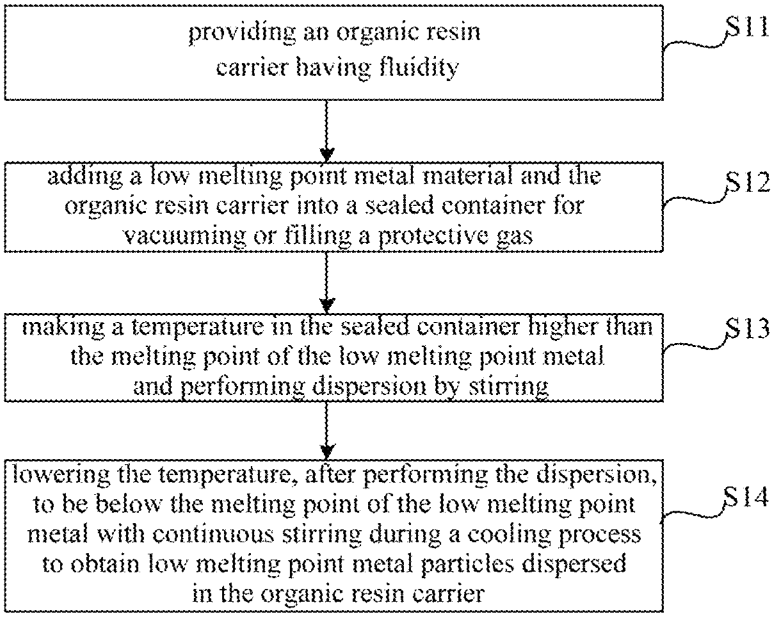
FIG. 1 is a flowchart of a method for preparing low melting point metal particles according to an embodiment of the present disclosure.

A first aspect of the present disclosure provides a method for preparing low melting point metal particles. FIG. 1 is a flowchart of a method for preparing low melting point metal particles according to an embodiment of the present disclosure. As shown in FIG. 1, the method for preparing low melting point metal particles includes following steps.

S11, an organic resin carrier having fluidity is provided.

There are many implementation examples for the organic resin carrier having fluidity, which can comprehensively be selected by a person skilled in the art according to a tolerating temperature and performance of the organic resin.

In one example, the organic resin carrier is an organic resin having fluidity at room temperature, such as epoxy resin or silicone resin which is liquid and has low viscosity at room temperature.

In yet another example, the organic resin carrier is a first organic resin solution obtained by dissolving the first organic resin with a first solvent. Optionally, the first solvent is one or more of the following: ethyl acetate, butyl acetate, isoamyl acetate, n-butyl glycolate, petroleum ether, acetone, butanone, cyclohexanone, methyl isobutyl ketone, diisobutyl ketone, toluene, xylene, butyl carbitol, alcohol ester 12, DBE, ethylene glycol butyl ether, ethylene glycol ethyl ether, dipropylene glycol methyl ether, n-hexane, cyclohexane, n-heptane, n-octane, and isooctane. The first organic resin is one or more of polyester resin, polyurethane resin, vinyl chloride vinyl acetate resin, silicone resin, gelatin, epoxy resin and chitosan.

In addition, the fluidity of the organic resin carrier is mainly determined by its viscosity. The increase of fluidity may reduce the isolation effect of low melting point metal in liquid state to a certain extent, and the decrease of fluidity may increase the operation difficulty. A person skilled in the art can choose them according to actual requirements. In some embodiments of the present disclosure, when the organic resin carrier is the first organic resin solution obtained by dissolving the first organic resin with the first solvent, the weight percentage of the first organic resin in the first organic resin solution is selected to be in a range of 10% to 70%, such as 15%, 20%, 25%, 30%, 35%, 40%, 45%, 50%, 55%, 60% or 65%, so that it has better isolation effect and operability simultaneously.

S12, a low melting point metal material and an organic resin carrier are added into a sealed container which is vacuumized or filled with a protective gas.

Optionally, the low melting point metal in the embodiments of the present disclosure is a metal or metal alloy with a melting point higher than room temperature and lower than 300 □, such as a gallium-based alloy, an indium-based alloy, and a bismuth-based alloy. Considering the temperature resistance of the organic resin and the boiling point of the first solvent, the melting point of the low melting point metal can be selected to be higher than room temperature and lower than 200° C., more preferably 50° C. to 150° C. The low melting point metal material added in this step can be in a shape of block, ingot, particles with large particle size and the like.

Exemplarily, in some embodiments of the present disclosure, in a mixture of the low melting point metal material and the organic resin carrier, the weight percentage of the low melting point metal material may be in a range of 1% to 90%, such as 1%, 2%, 5%, 10%, 20%, 30%, 40%, 50%, 60%, 70%, 80% or 90%, the weight percentage of the organic resin carrier can be 10% to 99%, such as 10%, 15%, 20%, 30%%, 40%, 50%, 60%, 70%, 80%, 90%, 95%, 98% or 99%, so as to better balance the efficiency and the dispersion effect of low melting point metals.

Optionally, a protective gas of the low melting point metal material is argon or nitrogen.

Optionally, before adding the low melting point metal material and the organic resin carrier into the sealed container, the oxides in the low melting point metal material can be removed first, thereby improving the dispersion effect of the low melting point metal in the subsequent steps, which is beneficial to preparing low melting point metal particles with uniform and small size. Removing oxides mainly refers to removing the oxide layer covered by the low melting point metal material. There are various ways to remove oxides, such as acid pickling and erasing.

S13, the temperature in the sealed container is higher than the melting point of the low melting point metal, and stirring and dispersing are performed simultaneously.

The specific selection of stirring speed and stirring time can be comprehensively selected according to equipment conditions, target particle size range.

S14, after stirring and dispersing are completed, the temperature is lowered to below the melting point of the low melting point metal, and stirring is continued during the cooling process to obtain low melting point metal particles dispersed in the organic resin carrier.

In the above preparing process, firstly, it is carried out under vacuum or protective gas to prevent the oxidation of low melting point metals; secondly, there is no strong mechanical collision, which may not cause local high temperature, and can prevent the melting and agglomeration of low melting point metals; thirdly, low melting point metal particles can be prepared, and low melting point alloys can also be prepared. Therefore, the method for preparing low melting point metal particles in the present disclosure can effectively prepare low melting point metal particles.

Figure 2:
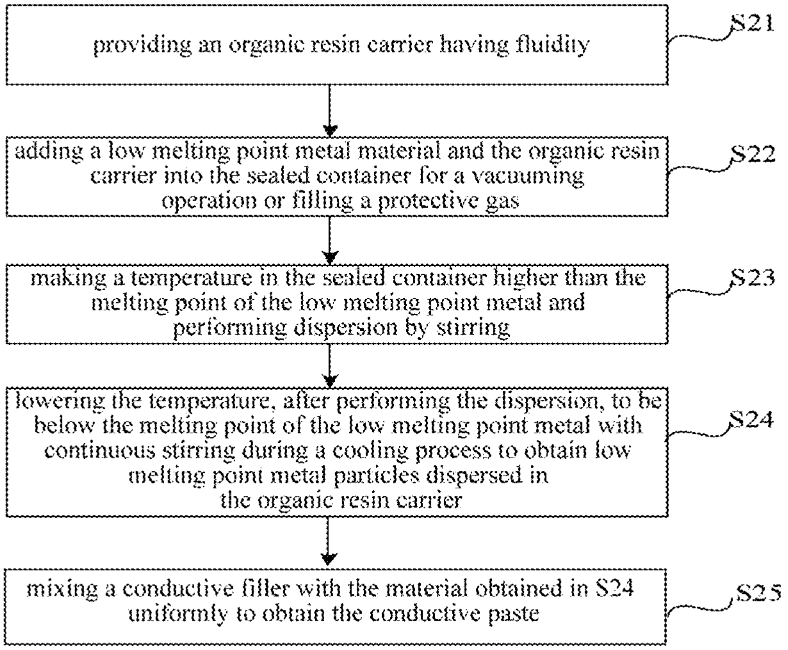
FIG. 2 is an optical micrograph of the low melting point metal particles prepared by the embodiments of the present disclosure.
Figure 5:
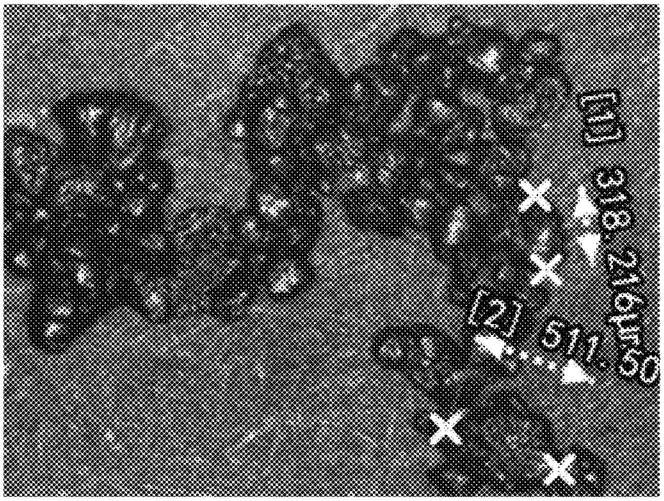
FIG. 5 is an optical micrograph of the low melting point metal particles prepared by Comparative Example 1.

FIG. 5 is an optical micrograph of the low melting point metal particles prepared in the embodiments of the present disclosure. As shown in FIG. 2, the prepared low melting point metal particles are relatively uniform in size, and the particle size can be up to 0.1 μm to 20 μm.

Optionally, the method for preparing the low melting point metal particles in the embodiments of the present disclosure further includes: after the low melting point metal particles is dispersed in the organic resin carrier, the organic resin in the organic resin carrier is dissolved, washed and dried to separate low melting point metal particles.

The low melting point metal particles prepared in the embodiments of the present disclosure can be used for many purposes, such as being used as conductive fillers, thermal conductive fillers, phase change materials, welding materials, and consumables for additive preparing of electronic circuits.

For its application as a conductive filler, the present disclosure provides several methods for preparing a conductive paste.

First Method for Preparing a Conductive Paste

Figure 3:
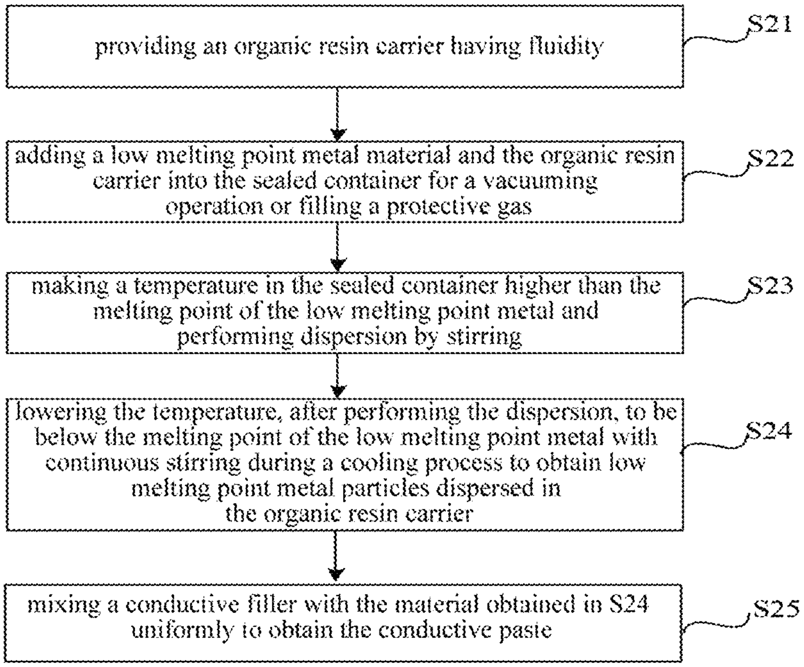
FIG. 3 is a flowchart of a method for preparing a first conductive paste according to an embodiment of the present disclosure.

FIG. 3 is a flowchart of a first method for preparing a conductive paste according to an embodiment of the present disclosure. As shown in FIG. 3, the method for preparing a conductive paste provided by an embodiment of the present disclosure includes following steps.

S21, an organic resin carrier having fluidity is provided.

S22, a low melting point metal material and an organic resin carrier are added into the sealed container which is vacuumized or filled with a protective gas.

S23, the temperature in the sealed container is higher than the melting point of the low melting point metal, and stirring and dispersing are performed simultaneously.

S24, after the stirring and dispersing is completed, the temperature is lowered to below the melting point of the low melting point metal, and the stirring is continued during the cooling process to obtain low melting point metal particles dispersed in the organic resin carrier.

It should be noted that steps S21 to S24 are actually steps for preparing low melting point metal particles, therefore, the specific limitations of the previous steps S11 to S14 are applicable here, and will not be repeated here.

In addition, it should be supplemented that for the selection of organic resin, in addition to the dispersion effect, the application scenario requirements of the conductive paste, such as solderability, adhesion, flexibility, etc, should be mainly considered.

In addition, an auxiliary agent can further be added to the material obtained in S24 to improve the comprehensive performance of the conductive paste. Optionally, the auxiliary agent includes one or more of dispersants, wetting agents, defoaming agents, and the like. Further, the dispersant may include one or more of anionic surfactants, nonionic surfactants and polymer surfactants.

S25, the conductive filler and the material obtained in S24 are evenly mixed to obtain a conductive paste.

Optionally, the conductive filler includes one or more conductive powder bodies such as silver powder, copper powder, carbon black, graphite, graphene, carbon nanotube, silver-coated copper powder, iron powder, iron-nickel powder and the like. Exemplarily, silver powder is selected as the conductive filler, and the silver powder may include one or more of flake silver powder, spherical silver powder, rod-shaped silver powder, needle-shaped silver powder, dendritic silver powder, and the like.

Optionally, in the embodiments of the present disclosure, the above S25 specifically includes: loading the conductive filler and the material obtained in S24 together into a sealed container; pre-dispersing by a mixer; processing by a three-axis rolling mill; and vacuuming to defoam.

It should be supplemented that the method for preparing the conductive paste in the embodiments of the present disclosure may further include: adding a viscosity modifier to adjust the viscosity of the conductive paste, resulting in a wider application range of the conductive paste. The viscosity modifier can be added in any one of the above steps, added between any two steps, or added before the conductive paste is used, which is not limited here. The above viscosity modifier can be one or more of ethyl acetate, petroleum ether, acetone, xylene, butyl carbitol, alcohol ester 12, DBE and the like.

The method for preparing the conductive paste in the embodiments of the present disclosure may further include a step of adding other film-forming substances. In some embodiments, in S22, the second solvent is added to dissolve the second organic resin, obtaining a second organic resin solution. For the film-forming material that is necessary for the conductive paste to achieve certain properties, but cannot withstand the temperature during the preparation of the low melting point metal particles, it can be added in this step.

Optionally, the second solvent is one or more of ethyl acetate, butyl acetate, isoamyl acetate, n-butyl glycolate, petroleum ether, acetone, butanone, cyclohexanone, methyl isobutyl ketone, diisobutyl ketone, toluene, xylene, butyl carbitol, alcohol ester 12, DBE, ethylene glycol butyl ether, ethylene glycol ethyl ether, dipropylene glycol methyl ether, n-hexane, cyclohexane, n-heptane, n-octane, and isooctane. The second organic resin is one or more of polyester resin, polyurethane resin, vinyl chloride vinyl acetate resin, silicone resin, gelatin, epoxy resin, and chitosan.

Second Method for Preparing a Conductive Paste

Figure 4:
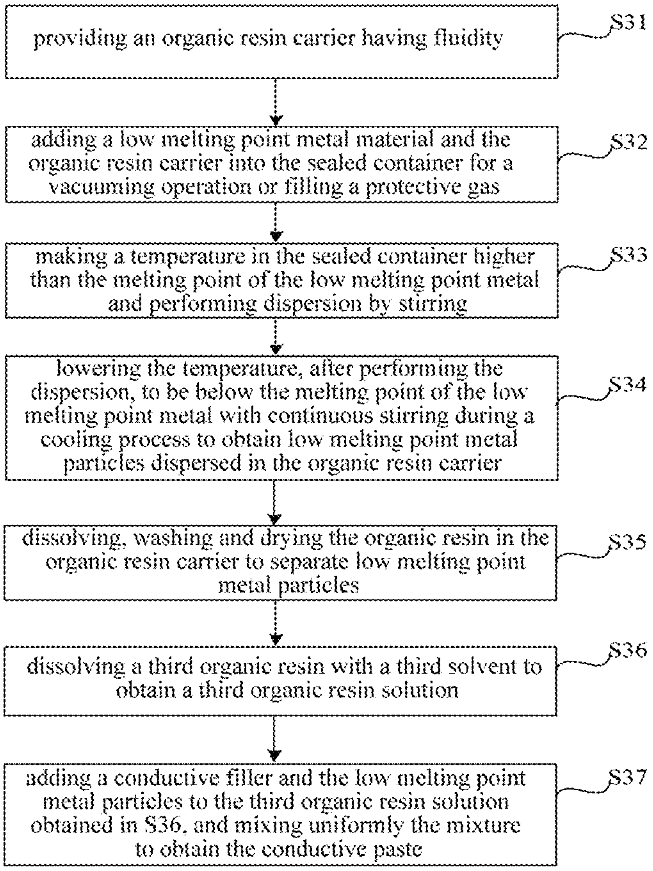
FIG. 4 is a flowchart of a method for preparing a second conductive paste according to an embodiment of the present disclosure.

FIG. 4 is a flowchart of a method for preparing a second conductive paste according to an embodiment of the present disclosure. As shown in FIG. 4, the method for preparing a conductive paste according to an embodiment of the present disclosure includes following steps.

S31, an organic resin carrier having fluidity is provided.

S32, a low melting point metal material and the organic resin carrier are added into a sealed container which is vacuumized or filled with a protective gas. The melting point of the low melting point metal is higher than room temperature.

S33, the temperature in the sealed container is higher than the melting point of the low melting point metal, and stirring and dispersing are performed simultaneously.

S34: after the stirring and dispersing are completed, the temperature is lowered to below the melting point of the low melting point metal, and the stirring is continued during the cooling process to obtain low melting point metal particles dispersed in the organic resin carrier.

S35, after the organic resin in the organic resin carrier is dissolved, washed and dried, the low melting point metal particles are separated.

It should be noted that steps S31 to S35 are actually steps for preparing low melting point metal particles. Therefore, the specific limitations in the previous methods for preparing low melting point metal particles are applicable here, and will not be elaborated here.

S36, a third solvent is used to dissolve the third organic resin to obtain a third organic resin solution.

For the selection of the third organic resin, the application scenario requirements of the conductive paste, such as solderability, adhesion, flexibility, etc, should be mainly considered.

Optionally, the third solvent is one or more of ethyl acetate, butyl acetate, isoamyl acetate, n-butyl glycolate, petroleum ether, acetone, butanone, cyclohexanone, methyl isobutyl ketone, diisobutyl ketone, toluene, xylene, butyl carbitol, alcohol ester 12, DBE, ethylene glycol butyl ether, ethylene glycol ethyl ether, dipropylene glycol methyl ether, n-hexane, cyclohexane, n-heptane, n-octane, and isooctane. The third organic resin is one or more of polyester resin, polyurethane resin, vinyl chloride vinyl acetate resin, silicone resin, gelatin, epoxy resin, and chitosan.

In addition, an auxiliary agent can further be added to the material obtained in S36 to improve the comprehensive performance of the conductive paste. Optionally, the auxiliary agent includes one or more of dispersants, wetting agents, defoaming agents, and the like. Further, the dispersant may include one or more of anionic surfactants, nonionic surfactants and polymer surfactants.

S37, the conductive filler and the low melting point metal particles are added to the material obtained in S36, and the mixture is evenly mixed to obtain a conductive paste.

Optionally, the conductive filler includes one or more conductive powder bodies such as silver powder, copper powder, carbon black, graphite, graphene, carbon nanotube, silver-coated copper powder, iron powder, iron-nickel powder and the like. Exemplarily, silver powder is selected as the conductive filler, and the silver powder may include one or more of flake silver powder, spherical silver powder, rod-shaped silver powder, needle-shaped silver powder, dendritic silver powder, and the like.

Optionally, S37 includes: loading the conductive filler and the material obtained in S36 together into a sealed container; pre-dispersing by a mixer; processing by a three-axis rolling mill; and vacuuming to defoam.

In addition, the present disclosure further provides a conductive paste prepared by using the method for preparing the first conductive paste or the method for preparing the second conductive paste described in any one of the above.

The conductive paste contains low melting point metal particles. The low melting point metal particles have good electrical conductivity. Therefore, the conductive paste can still have good electrical properties under the condition that the content of the conductive filler is low, which does not increase the complexity of preparing process of the conductive paste. Optionally, the particle size of the low melting point metal particles is in a range of 0.1 μm to 20 μm.

The conductive paste prepared in the embodiments of the present disclosure can be used to prepare conductive circuits by methods such as screen printing, flexographic printing, transfer printing, metal stencil printing, direct-writing printing, extrusion dispensing and the like. The conductive paste prepared in the embodiments of the present disclosure can be attached to various substrates such as PET, PVC, PI, PMMA, PC, ABS, PE, PP, etc, and can meet the functional requirements of conductive materials in different fields of modern industry.

In some embodiments, when the conductive paste prepared by the first preparing method includes an organic resin carrier (consisting of low melting point metal particles, a first organic resin and a first solvent) containing low melting point metal particles, conductive fillers, auxiliary agents and viscosity modifier, in the conductive paste, the weight percentage of the organic resin carrier containing low melting point metal particles can be in a range of 10% to 90%, such as 10%, 15%, 20%, 30%, 40%, 50%, 60%, 70%, 80% or 90%, the weight percentage of the conductive filler can be in a range of 10% to 70%, such as 10%, 15%, 20%, 30%, 40%, 50%, 60% or 70%. The weight percentage of the auxiliary agents can be in a range of 0% to 5%, such as 0%, 0.1%, 0.2%, 1%, 1.5%, 2%, 3%, 4% or 5%, and the weight percentage of the viscosity modifier can be in a range of 0% to 10%, such as 0%, 0.2%, 0.5%, 1%, 1.5%, 2%, 3%, 4%, 5%, 6%, 7%, 8%, 9%, or 10%.

When the conductive paste prepared by the second preparing method includes the third organic resin, the third solvent, the low melting point metal particles, the conductive filler and the auxiliary agent, the weight percentage of the third organic resin in the conductive paste may be in a range of 5% to 15%, such as 6%, 7%, 8%, 9%, 10%, 11%, 12%, 13% or 14%, the weight percentage of the third solvent is in a range of 15% to 25%, such as 16%, 17%, 18%, 19%, 20%, 21%, 22%, 23% or 24%, the weight percentage of low melting point metal particles can be in a range of 1% to 50%, such as 2%, 5%, 10%, 15%, 20%, 25%, 30%, 35%, 40% or 45%, the weight percentage of the conductive filler can be in a range of 30% to 70%, such as 10%, 15%, 20%, 30%, 40%, 50%, 60% or 70%, the weight percentage of the auxiliary agent can be in a range of 0% to 5%, such as 0.1%, 0.2%, 0.5%, 1%, 2%, 3% or 4%.

In order to facilitate understanding and implementation of a person skilled in the art, some examples and comparative examples are described in detail.

Example 1

Preparing Low Melting Point Metal Particles

| Composition | Type | Dosage (g) |
|---|---|---|
| Low melting point metal material | Melting point, 75 □ | 60 |
| Organic resin carrier | vinyl chloride vinyl acetate resin, DBE (solid content, 25%) | 10 |

The method for preparing low melting point metal particles includes following steps.

S1, 10 g of an organic resin carrier was weighed.

S2, 60 g of a low melting point metal material in which its surface have removed oxides was weighed, and put it into a sealed container with a stirring function together with the organic resin carrier obtained in S1.

S3, 0.3 MPa of argon gas was charged, heated to 100 □, a stirring paddle was turned on for stirring, and the mixing was completed after 60 minutes.

S4, after the mixing was completed, the heating was stopped and the stirring was continued.

S5, the material in the sealed container was an organic resin carrier containing low melting point metal particles.

Example 2

Preparing Low Melting Point Metal Particles

| Composition | Type | Dosage (g) |
|---|---|---|
| Low melting point metal material | Melting point, 75□ | 70 |
| Organic resin carrier | Epoxy resin, diethylene glycol butyl ether acetate (solid content, 30%) | 20 |

The method for preparing low melting point metal particles includes following steps.

S1, 70 g of an organic resin carrier was weighed.

S2, 70 g of a low melting point metal material in which its surface have removed oxides was weighed, and put it into a sealed container with a stirring function together with the organic resin carrier obtained in S1.

S3, 0.3 MPa of argon gas was charged, heated to 100 □, a stirring paddle was turned on for stirring, and the mixing was completed after 60 minutes.

S4, after the mixing was completed, the heating was stopped and the stirring was continued.

S5, the material in the sealed container was an organic resin carrier containing low melting point metal particles.

Example 3

Preparing Low Melting Point Metal Particles

| Composition | Type | Dosage (g) |
|---|---|---|
| Low melting point metal material | Melting point, 58 □ | 10 |
| organic resin carrier | Polyurethane resin, diethylene glycol ethyl ether acetate (solid content, 30%) | 90 |

The method for preparing low melting point metal particles includes following steps.

S90 1, g of an organic resin carrier was weighed.

S2, 10 g of a low melting point metal material in which its surface have removed oxides was weighed, and put it into a sealed container with a stirring function together with the organic resin carrier obtained in S1.

S3, 0.3 MPa of argon gas was charged, heated to 80 □, a stirring paddle was turned on for stirring, and the mixing was completed after 60 minutes.

S4, after the mixing was completed, the heating was stopped and the stirring was continued.

S5, the material in the sealed container was an organic resin carrier containing low melting point metal particles.

Example 4

Preparing Low Melting Point Metal Particles

| Composition | Type | Dosage (g) |
|---|---|---|
| Low melting point metal material | Melting point, 90 □ | 50 |
| Organic resin carrier | Polyester resin, DBE (solid content, 30%) | 50 |

The method for preparing low melting point metal particles includes:

S50 1, g of the organic resin carrier was weighed.

S50 2, g of a low melting point metal material in which its surface have removed oxides was weighed, and put it into a sealed container with a stirring function together with the organic resin carrier obtained in S1.

S3, 0.3 MPa of argon gas was charged, the temperature was heated to 150 □, a stirring paddle was turned on for stirring, and the mixing was completed after 60 minutes.

S4, after the mixing was completed, the heating was stopped and the stirring was continued.

S5, the material in the sealed container was an organic resin carrier containing low melting point metal particles.

S6, the organic resin was dissolved, washed, filtered, and dried at room temperature to obtain low melting point metal particles.

Example 5

Preparing Low Melting Point Metal Particles

| Composition | Type | Dosage (g) |
|---|---|---|
| Low melting point metal material | Melting point, 90□ | 30 |
| Organic resin carrier | Epoxy resin which is liquid and has low viscosity at room temperature | 70 |

The method for preparing low melting point metal particles includes following steps.

S1, 70 g of the organic resin carrier was weighed.

S2, 30 g of low melting point metal material in which its surface have removed oxides was weighed, and put it into a sealed container with a stirring function together with the organic resin carrier obtained in S1.

S3, 0.3 MPa of argon gas was charged, heated to 150 □, a stirring paddle was turned on for stirring, and the mixing was completed after 60 min.

S4, after the mixing was completed, the heating was stopped and the stirring was continued.

S5, the material in the sealed container was an organic resin carrier containing low melting point metal particles.

S6, the organic resin was dissolved, washed, filtered, and dried at room temperature to obtain low melting point metal particles.

Example 6

Preparing Low Melting Point Metal Particles

| Composition | Type | Dosage (g) |
|---|---|---|
| Low melting point metal material | Melting point, 90□ | 40 |
| Organic resin carrier | Silicone resin with low viscosity (100%) | 60 |

The method for preparing low melting point metal particles includes following steps.

S1, 90 g of the organic resin carrier was weighed.

S2, 40 g of a low melting point metal material in which its surface have removed oxides was weighed, and put into a sealed container with a stirring function together with the organic resin carrier obtained in S1.

S3, 0.3 MPa of argon gas was charged, heated to 150 □, a stirring paddle was turned on for stirring, and the mixing was completed after 60 min.

S4, after the mixing was completed, the heating was stopped and the stirring was continued.

S5, the material in the sealed container was an organic resin carrier containing low melting point metal particles;

S6, the organic resin was dissolved, washed, filtered, and dried at room temperature to obtain low melting point metal particles.

Example 7

Conductive Paste

| Component name | Dosage (g) | Adding ratio (%) |
|---|---|---|
| Material obtained in Example 1 | 105 | 62.5 |
| Flake silver powder | 53 | 31.55 |
| DBE | 10 | 5.95 |

A method for preparing a conductive paste includes following steps.

S1, 105 g of the material obtained in Example 1 was weighed.

S2, 10 g of DBE was added, and fully dispersed evenly.

S3, 53 g of flake silver powder was weighed, and put it into a sealed container together with the material obtained in S2.

S4, pre-dispersion was performed by using a mixer with a tooth-blade stirring paddle and 500 r/min of a stirring rate.

S5, after the mixing was completed, the above-mentioned materials were processed by a three-axis rolling mill.

S6, vacuuming to defoam was performed to remove air bubbles in the mixture.

The conductive paste of Example 7 had a square resistance of 256 mΩ (25.4 μm) after it was printed and cured.

Example 8

Conductive Paste

| Component name | Dosage (g) | Adding ratio (%) |
|---|---|---|
| Material obtained in Example 2 | 60 | 46.15 |
| Flake silver powder | 60 | 46.15 |
| Diethylene glycol butyl ether acetate | 9 | 6.92 |
| BYK-W966 | 1 | 0.76 |

A method for preparing a conductive paste includes following steps.

S1, 60 g of the material obtained in Example 2 was weighed.

S2, 9 g of diethylene glycol butyl ether acetate, 1 g of BYK-W966 were added, and fully dispersed evenly.

S3, 60 g of flake silver powder was weighed, and put it into a sealed container together with the material obtained in S2;

S4, pre-dispersion was performed by using a mixer with a tooth-blade stirring paddle and 500 r/min of a stirring rate.

S5, after the mixing was completed, the above-mentioned materials are processed by a three-axis rolling mill.

S6, vacuuming to defoam was performed to remove air bubbles in the mixture.

The conductive paste of Example 8 had a square resistance of 14.9 mΩ (25.4 μm) after it was printed and cured.

Example 9

Conductive Paste

| Component name | Dosage (g) | Adding ratio (%) |
|---|---|---|
| Material obtained in Example 1 | 20 | 16.26 |
| Flake silver powder | 90 | 73.17 |
| DBE | 3 | 2.44 |
| Polyester resin, DBE (solid content, 60%) | 10 | 8.13 |

A method for preparing a conductive paste includes following steps.

S1,20 g of the material obtained in Example 1 was weighed.

S2, 3 g of DBE, 10 g of a polyester resin solution was added, and fully dispersed evenly.

S3, 90 g of flake silver powder was weighed and put into a sealed container together with the material obtained in S2.

S4, pre-dispersion was performed by using a mixer with a tooth-blade stirring paddle and 500 r/min of a stirring rate.

S5, after the mixing was completed, the above-mentioned materials are processed by a three-axis rolling mill.

S6, vacuuming to defoam was performed to remove air bubbles in the mixture.

The conductive paste of Example 9 had a square resistance of 10.4 mΩ (25.4 μm) after it was printed and cured.

Example 10

| Component name | Dosage (g) | Adding ratio (%) |
|---|---|---|
| Low melting point metal particles obtained in Example 4 | 30 | 23.07 |
| Flake silver powder | 60 | 46.15 |
| DBE | 9 | 6.92 |
| BYK161 | 1 | 0.76 |
| Epoxy resin, diethylene glycol butyl ether acetate (solid content, 30%) | 30 | 23.08 |

A method for preparing a conductive paste includes following steps.

S1, 30 g of an epoxy resin solution was weighed, 1 g of BYK161 and 9 g of DBE were added, and fully dispersed evenly.

S2, 60 g of flake silver powder was weighed, 30 g of the low melting point metal particles obtained in Example 4 was weighed, and added to the material obtained in S1;

S3, pre-dispersion was performed by using a mixer with a tooth-blade stirring paddle and 500 r/min of a stirring rate.

S4, after the mixing was completed, the above-mentioned materials are processed by a three-axis rolling mill.

S5, vacuuming to defoam was performed to remove air bubbles in the mixture.

The conductive paste of Example 10 had a square resistance of 16 mΩ (25.4 μm) after it was printed and cured.

Comparative Example 1

| Composition | Type | Dosage (g) |
|---|---|---|
| Low melting point metal material | Melting point, 75 □ | 60 |
| Solvent | Ethylene glycol ether acetate | 10 |

S1, 10 g of solvent was weighed.

S2, 60 g of a low melting point metal material in which its surface have removed oxides was weighed, and put it into a sealed container with a stirring function together with the organic resin carrier obtained in S1.

S3, 0.3 MPa of argon gas was charged, heated to 100 □, a stirring paddle was turned on for stirring, and the mixing was completed after 60 minutes.

S4, after the mixing was completed, the heating was stopped and the stirring was continued.

S5, the material in the sealed container is a solvent containing low melting point metal particles.

FIG. 5 is an optical micrograph of the low melting point metal particles prepared in Comparative Example 1. As shown in FIG. 5, the low melting point metal particles prepared in Comparative Example 1 have a particle size of 300 μm to 600 μm.

Comparative Example 2

Conductive Paste

| Composition | Type | Dosage (g) | Adding ratio (%) |
|---|---|---|---|
| Resin material | Epoxy resin, diethylene glycol butyl ether acetate (solid content, 30%) | 10.5 | 62.5 |
| Conductive filler | Flake silver powder | 5.3 | 31.5 |
| Viscosity modifier | Diethylene glycol butyl ether acetate | 1 | 6.0 |

The conductive paste of Comparative Example 2 was not conductive after it was printed and cured.

Comparative Example 3

Conductive Paste

| Composition | Type | Dosage (g) | Adding ratio (%) |
|---|---|---|---|
| Resin material | Epoxy resin, diethylene glycol butyl ether acetate (solid content, 30%) | 6 | 46.15 |
| Conductive filler | Flake silver powder | 6 | 46.15 |
| Viscosity modifier | Diethylene glycol butyl ether acetate | 0.9 | 6.92 |
| Dispersant | Hydroxy functional carboxylates with pigment affinity groups | 0.1 | 0.76 |

The conductive paste of Comparative Example 3 had a square resistance of 150 mΩ (25.4 μm) after it was printed and cured.

Finally, it should be noted that the technical solutions of the present disclosure are illustrated by the above embodiments, but not intended to limit thereto. Although the present disclosure has been described in detail with reference to the foregoing embodiments, a person skilled in the art can understand that the present disclosure is not limited to the specific embodiments described herein, and can make various obvious modifications, readjustments, and substitutions without departing from the scope of the present disclosure.

What is claimed is:

1. A method for preparing low melting point metal particles, comprising:

S11, providing an organic resin carrier having fluidity;

S12, adding a low melting point metal material and the organic resin carrier into a sealed container which is vacuumized or filled with a protective gas;

S13, making a temperature in the sealed container higher than a melting point of the low melting point metal and performing dispersion by stirring;

S14: lowering the temperature, after performing the dispersion, to be below the melting point of the low melting point metal with continuous stirring during a cooling process to obtain low melting point metal particles dispersed in the organic resin carrier; and S15, dissolving, washing and drying an organic resin in the organic resin carrier to separate the low melting point metal particles after obtaining the low melting point metal particles dispersed in the organic resin carrier;

wherein the organic resin carrier includes the organic resin having fluidity at room temperature;

wherein the organic resin carrier is a first organic resin solution obtained by dissolving a first organic resin with a first solvent; and wherein a weight percentage of the organic resin in the organic resin carrier is within a range from 10% to 70%.

2. The method according to claim 1, wherein, the melting point of the low melting point metal is higher than room temperature and lower than 200° C.

3. A method for preparing a conductive paste, comprising:

S21, providing an organic resin carrier having fluidity;

S22, adding a low melting point metal material and the organic resin carrier into a sealed container which is vacuumized or filled with a protective gas;

S23, making a temperature in the sealed container higher than a melting point of the low melting point metal and performing dispersion by stirring;

S24, lowering the temperature, after performing the dispersion, to be below the melting point of the low melting point metal with continuous stirring during a cooling process to obtain low melting point metal particles dispersed in the organic resin carrier; and S25, mixing a conductive filler with the material obtained in S24 uniformly to obtain the conductive paste.

4. The method according to claim 3, further comprising:

in S22, adding a second organic resin solution obtained by dissolving a second organic resin with a second solvent.

5. The method according to claim 3, further comprising:

adding a viscosity modifier to adjust a viscosity of the conductive paste.

6. A method for preparing a conductive paste, comprising:

S31, providing an organic resin carrier having fluidity;

S32, adding a low melting point metal material and the organic resin carrier into a sealed container which is vacuumized or filled with a protective gas;

S33, making a temperature in the sealed container higher than a melting point of the low melting point metal and performing dispersion by stirring;

S34, lowering the temperature, after performing the dispersion, to be below the melting point of the low melting point metal with continuous stirring during a cooling process to obtain low melting point metal particles dispersed in the organic resin carrier;

S35, dissolving, washing and drying the organic resin in the organic resin carrier to separate low melting point metal particles;

S36, dissolving a third organic resin with a third solvent to obtain a third organic resin solution;

S37, adding a conductive filler and the low melting point metal particles to the third organic resin solution obtained in S36, and mixing the mixture uniformly to obtain the conductive paste.

* * * * *